United States Patent
Hepworth et al.

(10) Patent No.: US 7,240,831 B2
(45) Date of Patent: Jul. 10, 2007

(54) SYSTEMS AND METHODS FOR ESTABLISHING COMMUNICATION BETWEEN AN IDENTIFICATION TAG READER AND A COMPUTING DEVICE

(75) Inventors: Paul Hepworth, Riverton, UT (US); George Powell, Sandy, UT (US); Jeremy Fillingim, South Salt Lake, UT (US)

(73) Assignee: The Code Corporation, Draper, UT (US)

( * ) Notice: Subject to any disclaimer, the term of this patent is extended or adjusted under 35 U.S.C. 154(b) by 148 days.

(21) Appl. No.: 10/761,573

(22) Filed: Jan. 21, 2004

(65) Prior Publication Data

US 2005/0156022 A1   Jul. 21, 2005

(51) Int. Cl.
*G06K 5/00*   (2006.01)
(52) U.S. Cl. .................................... 235/380; 235/375
(58) Field of Classification Search ............... 235/380, 235/382, 375, 494
See application file for complete search history.

(56) References Cited

U.S. PATENT DOCUMENTS

| | | | |
|---|---|---|---|
| 5,047,614 A | 9/1991 | Bianco | |
| 5,465,291 A | 11/1995 | Barrus et al. | |
| 5,483,052 A | 1/1996 | Smith, III et al. | |
| 5,804,803 A | 9/1998 | Cragun et al. | |
| 5,905,248 A | 5/1999 | Russell et al. | |
| 5,905,251 A | 5/1999 | Knowles | |
| 5,933,829 A | 8/1999 | Durst et al. | |
| 5,945,660 A | 8/1999 | Nakasuji et al. | |
| 5,978,773 A | 11/1999 | Hudetz et al. | |
| 5,992,752 A * | 11/1999 | Wilz et al. | 235/472.01 |
| 6,012,102 A | 1/2000 | Shachar | |
| 6,027,024 A | 2/2000 | Knowles | |
| 6,032,195 A * | 2/2000 | Reber et al. | 709/245 |
| 6,068,188 A | 5/2000 | Knowles | |
| 6,076,733 A | 6/2000 | Wilz, Sr. et al. | |
| 6,108,656 A | 8/2000 | Durst et al. | |
| 6,138,151 A | 10/2000 | Reber et al. | |
| 6,154,738 A | 11/2000 | Call | |
| 6,305,607 B1 | 10/2001 | Katz et al. | |
| 6,377,986 B1 | 4/2002 | Philyaw et al. | |
| 6,379,058 B1 | 4/2002 | Petteruti et al. | |
| 6,384,744 B1 | 5/2002 | Philyaw et al. | |
| 6,811,088 B2 | 11/2004 | Lanzaro et al. | |
| 7,031,660 B2 | 4/2006 | Vonheim et al. | |
| 2001/0037248 A1* | 11/2001 | Klein | 705/22 |

FOREIGN PATENT DOCUMENTS

| | | |
|---|---|---|
| EP | 0 837 406 | 4/1998 |
| WO | WO 98/40823 * | 3/1997 |
| WO | WO 98/49813 * | 4/1997 |
| WO | WO 98/03923 | 1/1998 |
| WO | WO/98/06055 | 2/1998 |
| WO | WO 98/24036 | 6/1998 |

\* cited by examiner

*Primary Examiner*—Karl D. Frech
(74) *Attorney, Agent, or Firm*—Madson & Austin

(57) ABSTRACT

An exemplary method involves reading a first identification tag. The first identification tag includes an instruction to form a logical connection with a computing device. Address information associated with the computing device is used to form the logical connection with the computing device in accordance with the instruction. Data is obtained. The data is transmitted to the computing device via the logical connection.

44 Claims, 13 Drawing Sheets

FIG. 3A
FIG. 3B
FIG. 3C

SYSTEMS AND METHODS FOR ESTABLISHING COMMUNICATION BETWEEN AN IDENTIFICATION TAG READER AND A COMPUTING DEVICE

TECHNICAL FIELD

The present invention relates generally to computers and computer-related technology. More specifically, the present invention relates to systems and methods for establishing communication between an identification tag reader and a computing device.

BACKGROUND

Computer technology has entered many areas to simplify manual tasks and to make information more readily available. Many people use several computer-related products every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have. Computer programs often need some type of manual input to help a user, from simply starting the program to entering a significant amount of input.

Before a user can access relevant electronic information, he or she usually enters some input before helpful information becomes available. By way of example, many computer users, when looking for particular information, will use the World Wide Web (the "Web") to find information. Typically users will begin their search for information by using a search engine on the Web. To perform a search, a user first enters one or more search terms. Typically, a user will then browse the results by clicking on various links and reading through the information found. After some manual browsing, the user often finds the relevant information. Finding and accessing electronic information from a CD-ROM or from a hard drive is similar in that some manual searching and browsing of data is generally required.

A machine-readable identification tag (hereinafter, "ID tag") is a machine-readable data storage medium that is used to uniquely identify something, such as a product or a representation of a product (e.g., a picture of a product in a catalog). Examples of ID tags include machine-readable graphical codes ("graphical codes"), radio frequency identification tags ("RFID tags"), magnetic stripes, and so forth. Machine-readable ID tags may be placed on objects, printed on labels that can be affixed to objects, inserted into printable documents that contain representations of objects, and so forth. An ID tag reader is a device that "reads," or obtains data from, an ID tag.

As mentioned, one type of ID tag is a graphical code. A graphical code is a graphical representation of information that consists of multiple graphical code elements having different light reflective or light emissive properties. Examples of different types of graphical codes include bar codes, data matrix codes, MaxiCodes, optical character recognition ("OCR") text, and so forth. Graphical codes have become widely used in many commercial environments, such as point-of-sale stations in retail stores and supermarkets, inventory and document tracking, and the like.

In view of the foregoing, benefits may be realized if means were provided for establishing electronic communication between a machine-readable ID tag reader and a computing device.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIGS. 3A–3C illustrate different examples of ID tags and ID tag readers that may be used in different embodiments of the invention;

DETAILED DESCRIPTION

Figure 1:
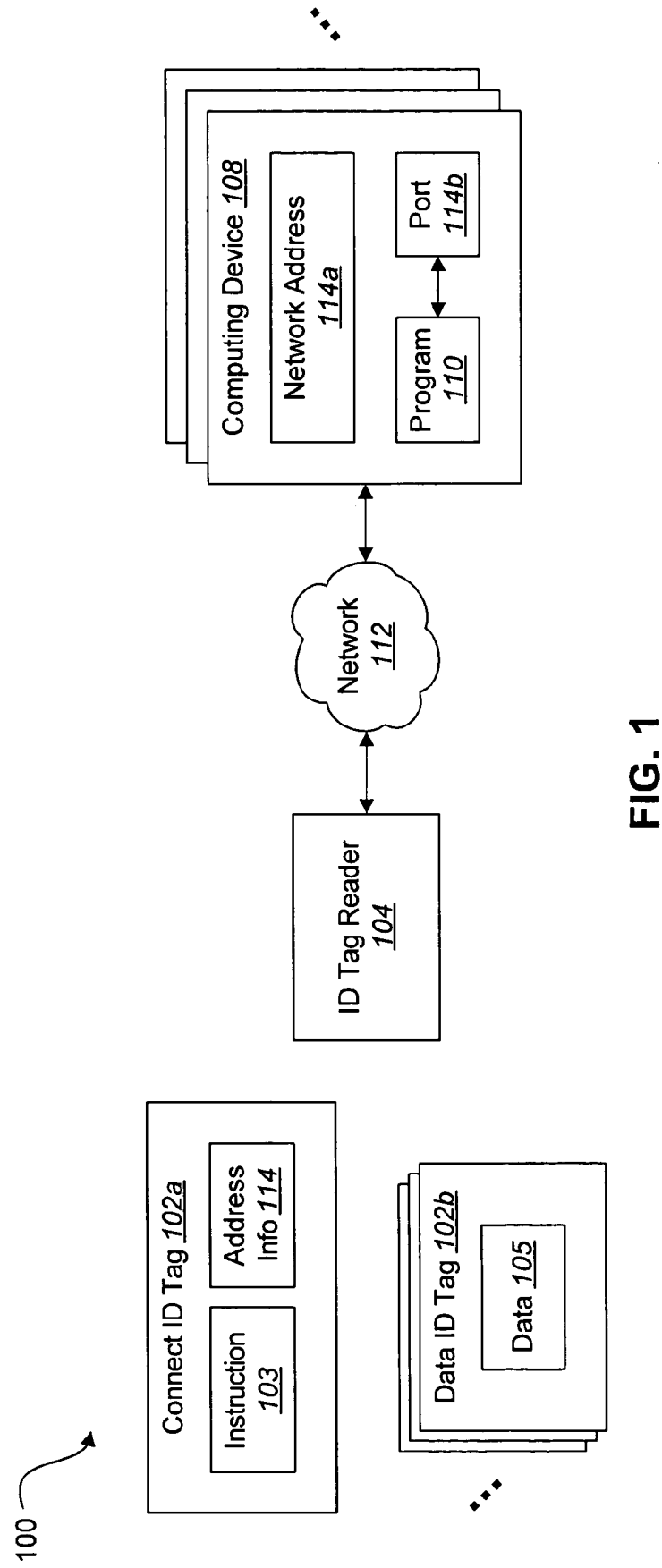
FIG. 1 illustrates an exemplary system in which some embodiments may be practiced.

A method that may be implemented in an identification tag reader is disclosed. A first identification tag is read. The first identification tag includes an instruction to form a logical connection with a computing device. Address information associated with the computing device is used to form the logical connection with the computing device in accordance with the instruction. Data is obtained. The data is transmitted to the computing device via the logical connection.

In some embodiments, the first identification tag includes the address information. Alternatively, the first identification tag may include a reference to the address information.

Obtaining the data may involve reading a second identification tag that comprises the data. Alternatively, obtaining the data may involve reading a second identification tag that comprises a reference to the data.

In some embodiments, the first identification tag includes the data. Alternatively, the first identification tag may include a reference to the data.

The address information may take many forms. For example, a program may be executing on the computing device, and the data may be transmitted to the program. In such embodiments, the address information may include a port associated with the program. Alternatively, or in addition, the identification tag reader and the computing device may be part of a computer network, and the address information may include a network address associated with the computing device.

The first identification tag may be a graphical code, a radio frequency identification tag, a magnetic stripe, or the like. Similarly, the identification tag reader may be a graphical code reader, a radio frequency identification tag reader, a magnetic stripe reader, or the like.

In some embodiments, the logical connection with the computing device may be formed in accordance with a Bluetooth standard, and the address information may include a computing device transceiver address. Where the identification tag reader is the master and the computing device is the slave, using the address information to form the logical connection with the computing device may involve transmitting a page identification packet to the computing device. The page identification packet may include a device access code that is derived from a lower address part of the computing device transceiver address. Where the computing device is the master and the identification tag reader is the slave, using the address information to form the logical connection with the computing device may involve transmitting a traffic packet to the computing device. The traffic packet may include a channel access code that is derived from a lower address part of the computing device transceiver address.

The logical connection with the computing device may be formed in accordance with the TCP/IP or UDP/IP protocol. In such embodiments, the address information may include an IP address associated with the computing device and a port associated with a program that is executing on the computing device. Using the address information to form the logical connection with the computing device may involve preparing an IP packet that comprises the IP address and the port. The logical connection with the computing device may exist over a wireless network.

At some point, the identification tag reader may power down. On subsequent power up, the method may also involve attempting to form a new logical connection with a same computing device to which the identification tag reader was most recently connected.

An identification tag reader is also disclosed. The identification tag reader includes a processor and memory in electronic communication with the processor. Instructions are stored in the memory. The instructions are executable by the processor to implement a method that involves reading a first identification tag. The first identification tag includes an instruction to form a logical connection with a computing device. The method also involves using address information associated with the computing device to form the logical connection with the computing device in accordance with the instruction. The method also involves obtaining data and transmitting the data to the computing device via the logical connection.

Another embodiment of an identification tag reader is also disclosed. The identification tag reader includes a processor and memory in electronic communication with the processor. Instructions are stored in the memory. The instructions are executable by the processor to implement a method that involves reading a first identification tag that comprises an instruction to form a logical connection with a computing device and to send subsequently read data to the computing device via the logical connection. The first identification tag also comprises address information associated with the computing device. The method also involves using the address information to form the logical connection with the computing device in accordance with the instruction. The method also involves reading a second identification tag that comprises data. The method also involves transmitting the data to the computing device via the logical connection.

Another embodiment of an identification tag reader is also disclosed. The identification tag reader includes a processor and memory in electronic communication with the processor. Instructions are stored in the memory. The instructions are executable by the processor to implement a method that involves reading an identification tag that comprises an instruction to form a logical connection with a computing device. The method also involves determining whether a link key database includes a link key associated with the computing device.

If the link key database includes the link key, the method involves establishing a logical connection with the computing device using address information associated with the computing device and the link key. If the link key database does not include the link key, the method involves establishing a logical connection with the computing device using address information associated with the computing device. A PIN entered by a user of the computing device is used for authentication. In some embodiments, the PIN is the serial number of the identification tag reader. As part of the connection and authentication process, a link key is generated. In some embodiments, the identification tag reader generates the link key. Alternatively, or in addition, the computing device may generate the link key. The method also involves storing the link key in the link key database. Whether or not the link key database includes the link key, the method also involves obtaining data and transmitting the data to the computing device via the logical connection.

In some embodiments, the link key is generated according to a Bluetooth standard. Also, in some embodiments, the identification tag reader is the master, and the computing device is the slave.

It will be readily understood that the components of the embodiments as generally described and illustrated in the Figures herein could be arranged and designed in a wide variety of different configurations. Thus, the following more detailed description of various embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several of the embodiments described herein include one or more software programs stored in a computing device. As used herein, a software program may include any type of computer instruction or computer executable code located within a memory device and/or transmitted as electronic signals over a system bus or network. A software program may, for instance, comprise one or more physical or logical blocks of computer instructions, which may be organized as a routine, object, component, data structure, etc., that performs one or more tasks or implements particular abstract data types. A software program may comprise a single instruction, or many instructions, and may be distributed over several different code segments and/or across several memory devices. Some embodiments may be practiced in a distributed computing environment where tasks are performed by a remote processing device linked through a communications network. In a distributed computing environment, a software program may be located in local and/or remote memory storage devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 illustrates an exemplary system 100 in which some embodiments may be practiced. The system 100 includes one or more machine-readable identification tags 102 (hereinafter, "ID tags 102"). An ID tag 102 is a machine-readable data storage medium that is used to uniquely identify something, such as a product, a representation of a product (e.g., a picture of a product in a catalog) or information that relates to the product. An ID tag reader 104 is a device that "reads," or obtains data from, an ID tag 102. Two different types of ID tags 102 are shown in FIG. 1, a connect ID tag 102a and one or more data ID tags 102b. The data ID tags 102b include data 105 to be sent to the computing device 108. The connect ID tag 102a and the data ID tags 102b will be discussed in greater detail below.

The system 100 also includes one or more computing devices 108. A computing device 108 is any device that includes a digital processor capable of receiving and processing data. Examples of computing devices 108 include personal computers, hand-held computers, microcontrollers, servers, mainframes, supercomputers, and so forth. At least one software program 110 is executing on the computing device(s) 108.

The ID tag reader 104 is capable of electronic communication with the computing device(s) 108 in the system 100. In some embodiments, both the ID tag reader 104 and the computing device(s) 108 are part of a computer network 112, and data sent from the ID tag reader 104 may pass through one or more intervening nodes on the network 112 en route to the computing device(s) 108. Many different types of networks 112 are known to those skilled in the art. The embodiments disclosed herein are not limited to any specific type of network 112.

Many different kinds of address information 114 may be associated with each computing device 108 in the system 100. For example, each computing device 108 may be associated with a network address 114a that uniquely identifies the computing device 108 within the network 112. As another example, each program 110 that is executing on a computing device 108 may be associated with a port 114b.

As mentioned previously, two different types of ID tags 102 are shown in FIG. 1, a connect ID tag 102a and one or more data ID tags 102b. The connect ID tag 102a includes an instruction 103 to send data to a particular computing device 108 within the system 100. More specifically, the connect ID tag 102a includes an instruction 103 form a logical connection between the ID tag reader 104 and a particular computing device 108 and to send subsequently read data 105 (i.e., any data 105 that is subsequently read from one or more data ID tags 102b) to the computing device 108 via this connection. In some embodiments, the ID tag reader 104 may interpret a preamble (or other portion of the connect ID tag 102a) as the instruction 103. Alternatively, or in addition, the ID tag reader 104 may interpret the format of the connect ID tag 102a as the instruction 103.

The connect ID tag 102a includes address information 114 associated with the computing device 108 with which the logical connection is to be formed. For example, the connect ID tag 102a may include the network address 114a associated with the computing device 108 and/or the port 114b associated with a program 110 that is executing on the computing device 108. The ID tag reader 104 typically uses address information 114 read from the connect ID tag 102a to form a logical connection with the computing device 108.

Figure 2:
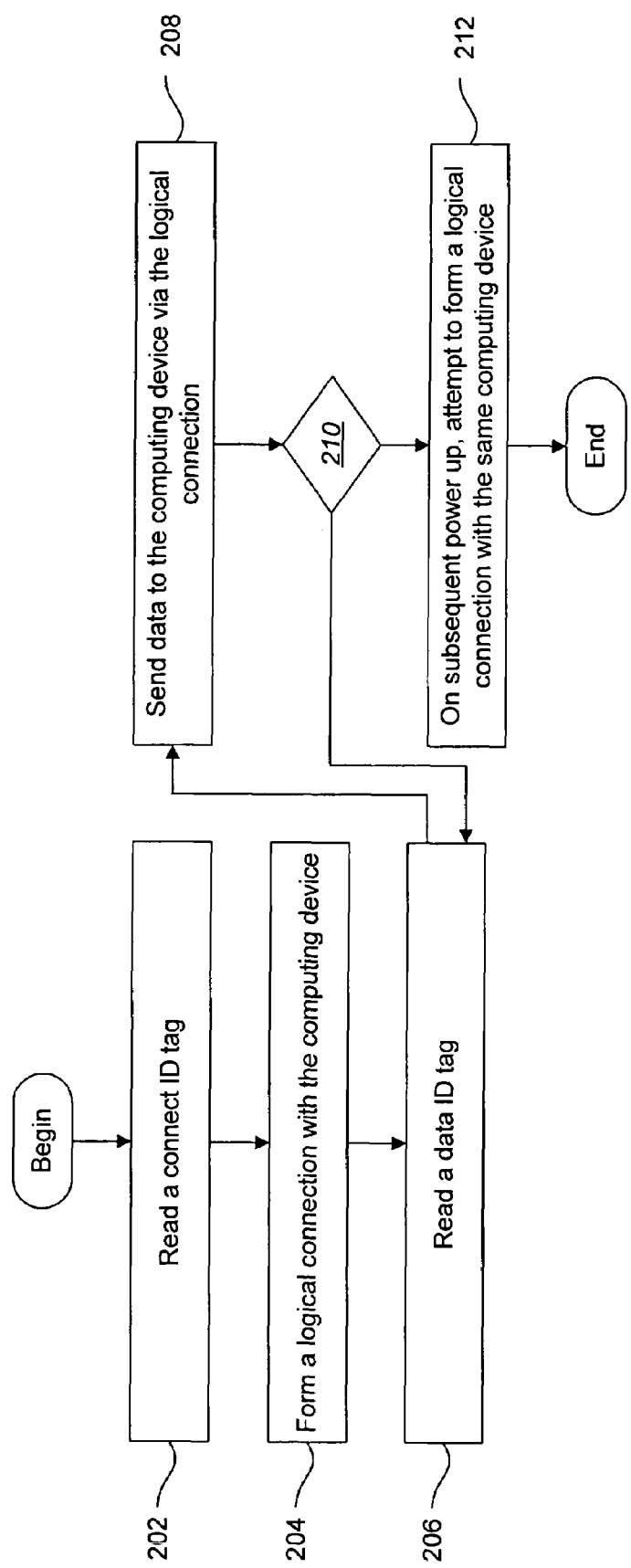
FIG. 2 illustrates a method that may be performed by an ID tag reader according to an embodiment of the invention.

FIG. 2 illustrates an embodiment of a method 200 that may be performed by an ID tag reader 104 in the system 100 shown in FIG. 1. The method 200 begins when the ID tag reader 104 reads 202 a connect ID tag 102a. As discussed previously, the connect ID tag 102a includes an instruction 103 to form a logical connection between the ID tag reader 104 and a particular computing device 108 and to send subsequent data 105 to the computing device 108 via this connection. The connect ID tag 102a also includes address information 114 associated with the computing device 108 with which the logical connection is to be formed.

The ID tag reader 104 then forms 204 a logical connection between the ID tag reader 104 and the computing device 108 in accordance with the instruction 103. The address information 114 read from the connect ID tag 102a is typically used to form this logical connection.

The ID tag reader 104 then reads 206 a data ID tag 102b. As discussed previously, the data ID tag 102b includes data 105 to be sent to the computing device 108. The ID tag reader 104 sends 208 the data 105 to the computing device 108 via the logical connection formed in step 204. If there are additional data ID tags 102b to be read, the method 200 returns to step 206 and proceeds as described above.

At some point, the ID tag reader 104 powers down. On subsequent power up, the ID tag reader 104 attempts 212 to form a logical connection with the same computing device 108, i.e., the computing device 108 with which the ID tag reader 104 was most recently connected.

Those skilled in the art will recognize there can be any number of ID tag readers 104 and any number of computing devices 108 in the network 112. Moreover, the connection of an ID tag reader 104 to a computing device 108 may be dynamic. Different ID tag readers 104 may send data 105 to different specific computing devices 108 at different times.

FIGS. 3A–3C illustrate different examples of ID tags 302 and ID tag readers 304 that may be used in different embodiments of the invention. In FIG. 3A, the ID tag 302a is a graphical code 302a, and the ID tag reader 304a is a graphical code reader 304a. In FIG. 3B, the ID tag 302b is an RFID tag 302b, and the ID tag reader 304b is an RFID tag reader 304b. In FIG. 3C, the ID tag 302c is a magnetic stripe 302c, and the ID tag reader 304c is a magnetic stripe reader 304c.

Figure 4:
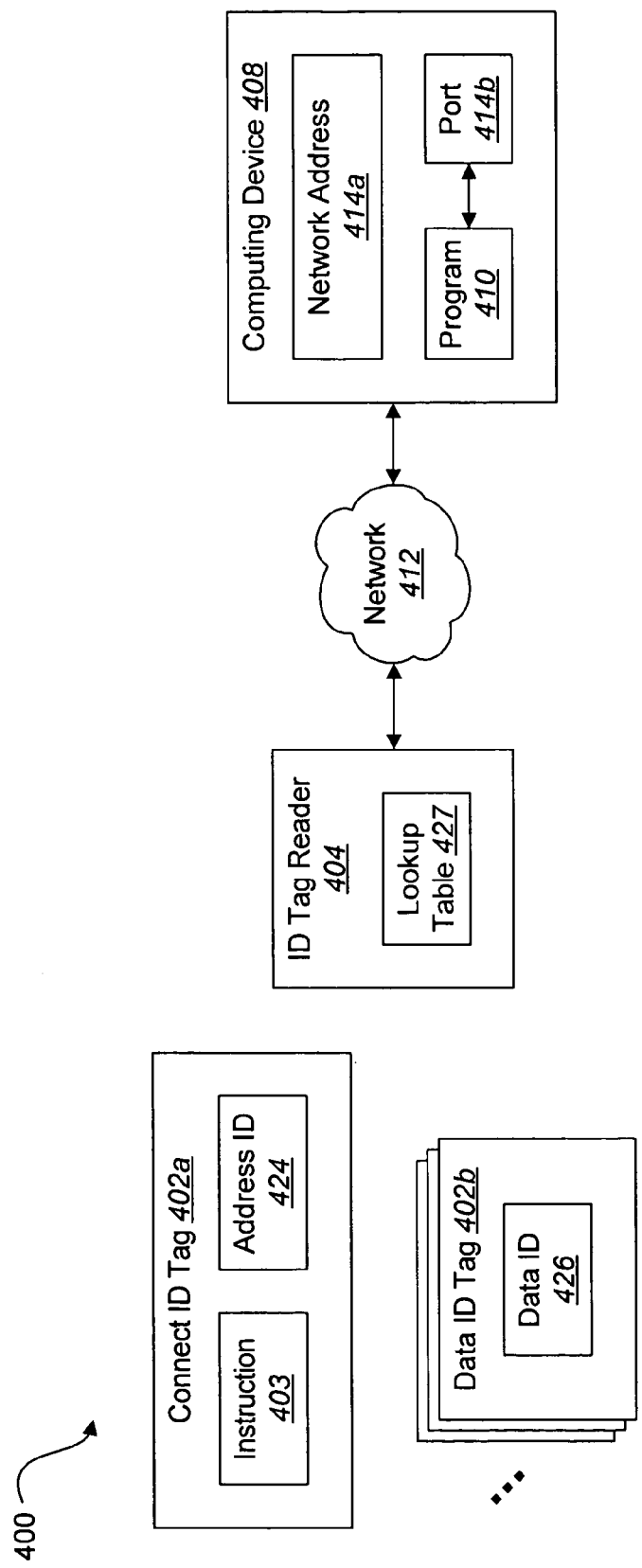
FIG. 4 illustrates another exemplary system in which some embodiments may be practiced.

FIG. 4 illustrates another exemplary system 400 in which some embodiments may be practiced. The system 400 shown in FIG. 4 is similar to the system 100 shown in FIG.

1, except for the following. In the system 400 shown in FIG. 4, the connect ID tag 402*a* includes a reference to the address information, and the data ID tag 402*b* includes a reference to the data that is to be sent to the computing device 408. The reference to the address information is illustrated in FIG. 4 as an address identifier 424. The reference to the data is illustrated in FIG. 4 as a data identifier 426.

The ID tag reader 404 includes a lookup table 427. In alternative embodiments, the lookup table 427 may be stored on a separate computing device with which the ID tag reader 404 is in electronic communication. The lookup table 427 includes a plurality of address identifiers 424 and a plurality of data identifiers 426. Each address identifier 424 in the lookup table 427 is associated with address information of one or more computing devices 408. Each data identifier 424 in the lookup table 427 is associated with data to be sent to the computing device 408.

In the illustrated embodiment, when the ID tag reader 404 reads a connect ID tag 402*a*, an instruction 403 to establish a logical connection with the computing device 408 is obtained, as described above. An address identifier 424 is also obtained. The ID tag reader 404 obtains the address information associated with the address identifier 424 by searching the lookup table 427. The address information is then used to establish the logical connection with the computing device 408, as discussed above.

When the ID tag reader 404 reads a data ID tag 402*b*, a data identifier 426 is obtained. The ID tag reader 404 obtains the data associated with the data identifier 426 by searching the lookup table 427. The data is then sent to the computing device 408, as discussed above.

Figure 5:
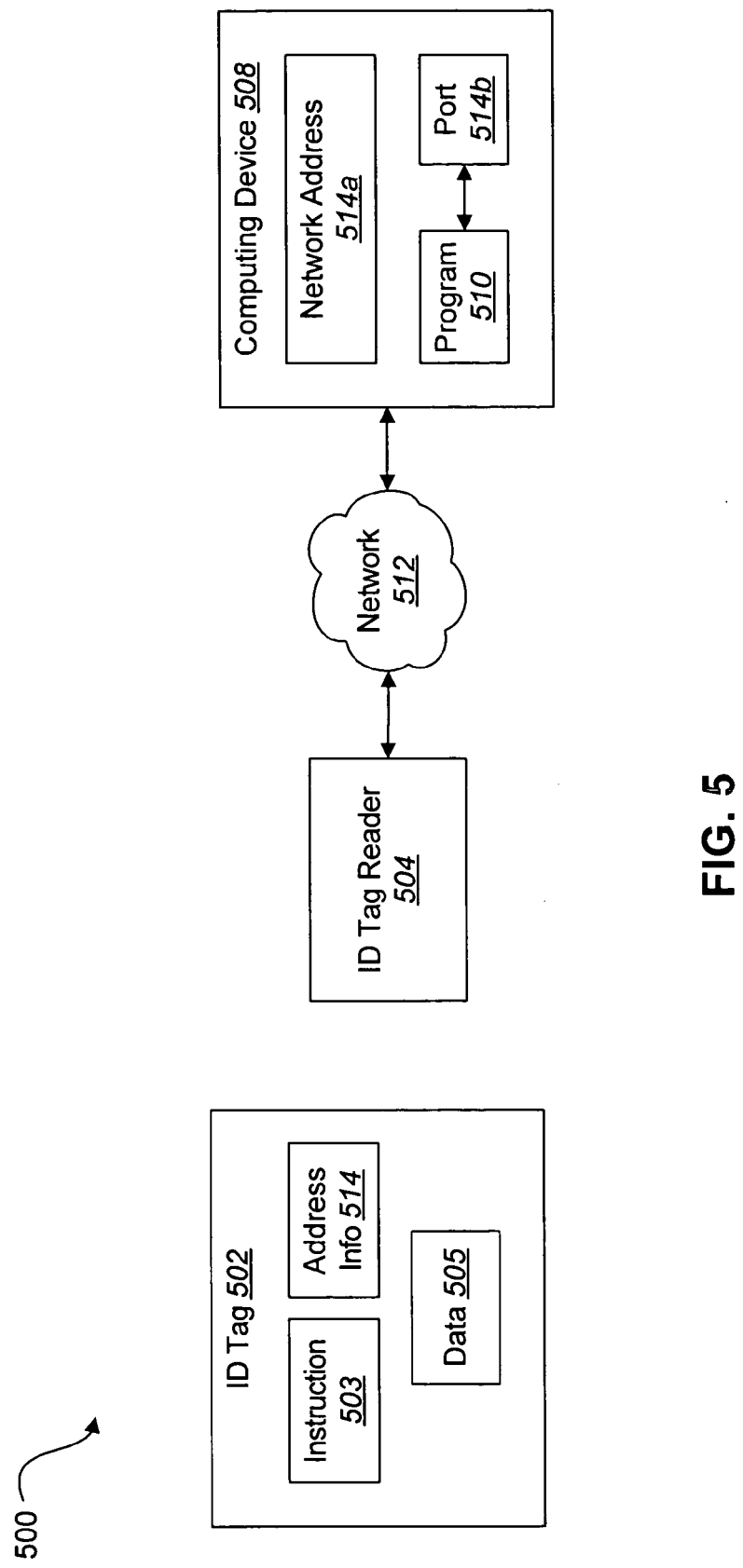
FIG. 5 illustrates another exemplary system in which some embodiments may be practiced.

FIG. 5 illustrates another exemplary system 500 in which some embodiments may be practiced. The system 500 shown in FIG. 5 is similar to the system 100 shown in FIG. 1, except for the following. In the system 500 shown in FIG. 5, the data 505 and an instruction 503 to send the data 505 to the computing device 508 are included within the same ID tag 502. The ID tag 502 also includes address information 514 associated with the computing device 508.

In typical operation, the ID tag reader 504 reads the ID tag 502, thereby obtaining the instruction 503, the address information 514, and the data 505. The ID tag reader 505 then sends the data 505 within the ID tag 502 to the computing device 508 in accordance with the instruction 503. The ID tag reader 505 typically uses the address information 514 to send the data 505 to the computing device 508.

Figure 6:
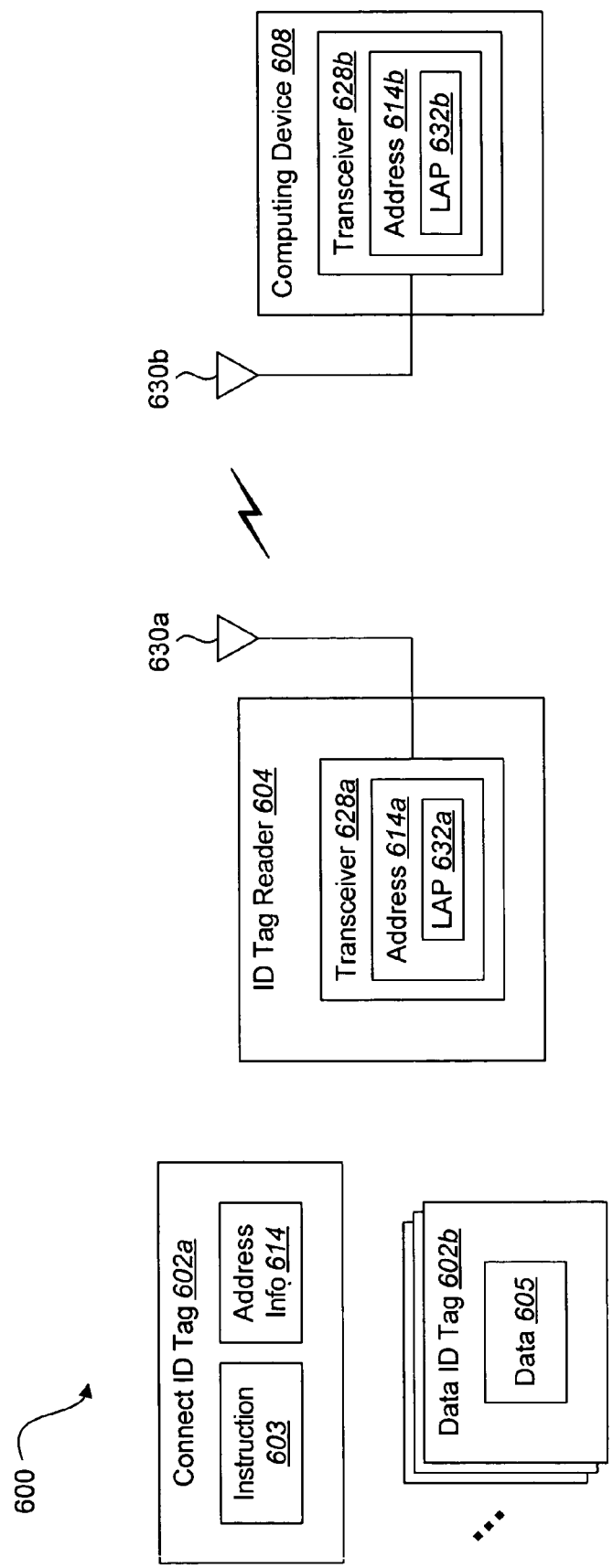
FIG. 6 illustrates another exemplary system in which some embodiments may be practiced.

FIG. 6 illustrates another exemplary system 600 in which some embodiments may be practiced. In the embodiment shown in FIG. 6, communication between the ID tag reader 604 and the computing device 608 occurs over a wireless communication link in accordance with a Bluetooth standard. The embodiments disclosed herein are not intended to be limited to a specific Bluetooth standard, but are applicable to any Bluetooth standard, whether presently known or later developed. There are presently two different Bluetooth standards, one developed by the Bluetooth Special Interest Group (SIG), referred to as the Bluetooth V1.1 specification, and another developed by the Institute of Electrical and Electronics Engineers (IEEE), referred to as IEEE 802.15.1. Both of these standards are hereby incorporated by reference in their entirety.

Both the ID tag reader 604 and the computing device 608 are equipped with a transceiver 628 that is in electronic communication with an antenna 630. The transceiver 628 on the ID tag reader 604 will be referred to herein as the ID tag reader transceiver 628*a*, and the antenna 630 on the ID tag reader 604 will be referred to as the ID tag reader antenna 630*a*. The transceiver 628 on the computing device 608 will be referred to herein as the computing device transceiver 628*b*, and the antenna on the computing device 608 will be referred to as the computing device antenna 630*b*. Both the ID tag reader transceiver 628*a* and the computing device transceiver 628*b* are configured to perform frequency hopping, i.e., the repeated switching of frequencies during radio transmission according to a specified algorithm.

The ID tag reader transceiver 628*a* is associated with a unique address which will be referred to herein as the ID tag reader transceiver address 614*a*. The ID tag reader transceiver address 614*a* is referred to in presently available Bluetooth standards as the BD_ADDR (Bluetooth device address) of the ID tag reader transceiver 628*a*. The ID tag reader transceiver address 614*a* includes a lower address part (LAP) 632*a*. The computing device transceiver 628*b* is also associated with a unique address which will be referred to herein as the computing device transceiver address 614*b*. The computing device transceiver address 614*b* is referred to in presently available Bluetooth standards as the BD_ADDR of the computing device 608. The computing device transceiver address $614_b$ includes a lower address part (LAP) 632*b*.

Presently known Bluetooth systems employ a master/slave design. The basic unit of a Bluetooth system is a piconet, which consists of a master and up to seven active slaves within a distance of 10 meters. A piconet is a centralized time division multiplexed (TDM) system, with the master controlling the clock and determining which device gets to communicate in which time slot. Communication in a piconet occurs between a master and a slave.

The Bluetooth V1.1 specification defines two device states: standby and connection. In addition, seven substates are defined: page, page scan, inquiry, inquiry scan, master response, slave response, and inquiry response. The characteristics of these states and substates are discussed in great detail in the Bluetooth V1.1 specification and will not be repeated here.

Figure 8:
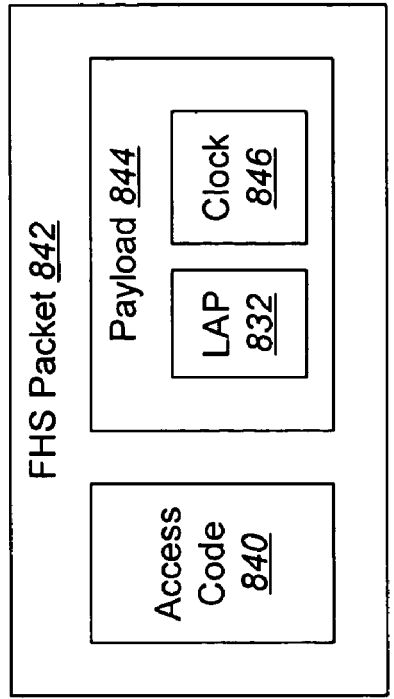
FIG. 8 illustrates an embodiment of a frequency hop synchronization (FHS) packet.
Figure 9:
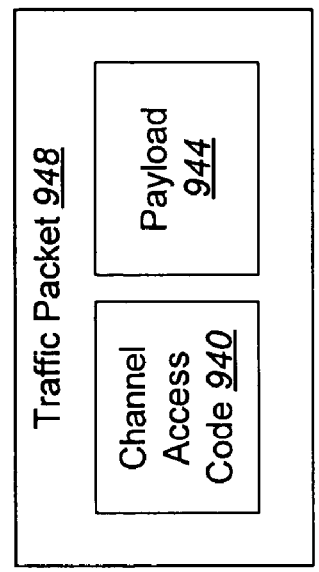
FIG. 9 illustrates an embodiment of a traffic packet.
Figure 7:
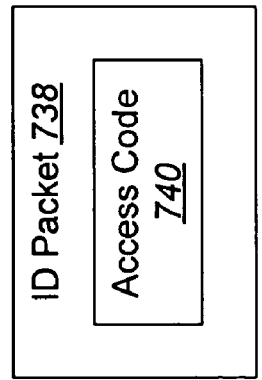
FIG. 7 illustrates an embodiment of an ID packet.

FIGS. 7 through 9 illustrate different messages that may be exchanged between the ID tag reader 604 and the computing device 608 while a Bluetooth link is being established. FIG. 7 illustrates an embodiment of an ID packet 738. An ID packet 738 may be transmitted from a master to a slave when the master is in the page substate or the inquiry substate. An ID packet 738 may also be transmitted from a slave to a master when the slave is in the slave response substate. The ID packet 738 starts with an access code 740. When a master transmits an ID packet 738 to a slave when the master is in the page substate, the access code 740 is a device access code (DAC), which is derived from the LAP of the slave's transceiver address. When a master transmits an ID packet 738 to a slave when the master is in the inquiry substate, the access code 740 is an inquiry access code (IAC). When a slave transmits an ID packet 738 to a master when the slave is in the slave response substate, the access code 740 is the DAC.

FIG. 8 illustrates an embodiment of a frequency hop synchronization (FHS) packet 842. An FHS packet 842 may be transmitted from a master to a slave when the master is in the page substate. An FHS packet 842 may also be transmitted from a slave to a master when the slave is in the inquiry response substate. The FHS packet 842 starts with an access code 840. When a master transmits an FHS packet 842 to a slave when the master is in the page substate, the access code 840 is the DAC. When the slave transmits an FHS packet 842 to a master when the slave is in the inquiry response substate, the access code 840 is an IAC. The payload 844 of the FHS packet 842 includes the LAP 832 of the transceiver address 814 of the device that sends the FHS packet 842, and the clock settings 846 of the device that sends the FHS packet 842. Other fields that are typically included in the payload 844 of the FHS packet 842 are described in greater detail in section 4.4.1.4 of Part B of the Bluetooth V1.1 specification.

FIG. 9 illustrates an embodiment of a traffic packet 948. A traffic packet 948 may be transmitted from a master to a slave, or from a slave to a master, when both the master and the slave are in the connection state. The traffic packet 948 starts with a channel access code (CAC) 940, which is derived from the LAP 632 of the master's transceiver address 614. A traffic packet 948 may include a payload 944, which may include data.

One specific type of traffic packet 948 is a POLL packet. A POLL packet is transmitted from a master to a slave. A POLL packet does not have a payload 944. Upon reception of a POLL packet the slave responds with some type of traffic packet 948.

Figure 10:
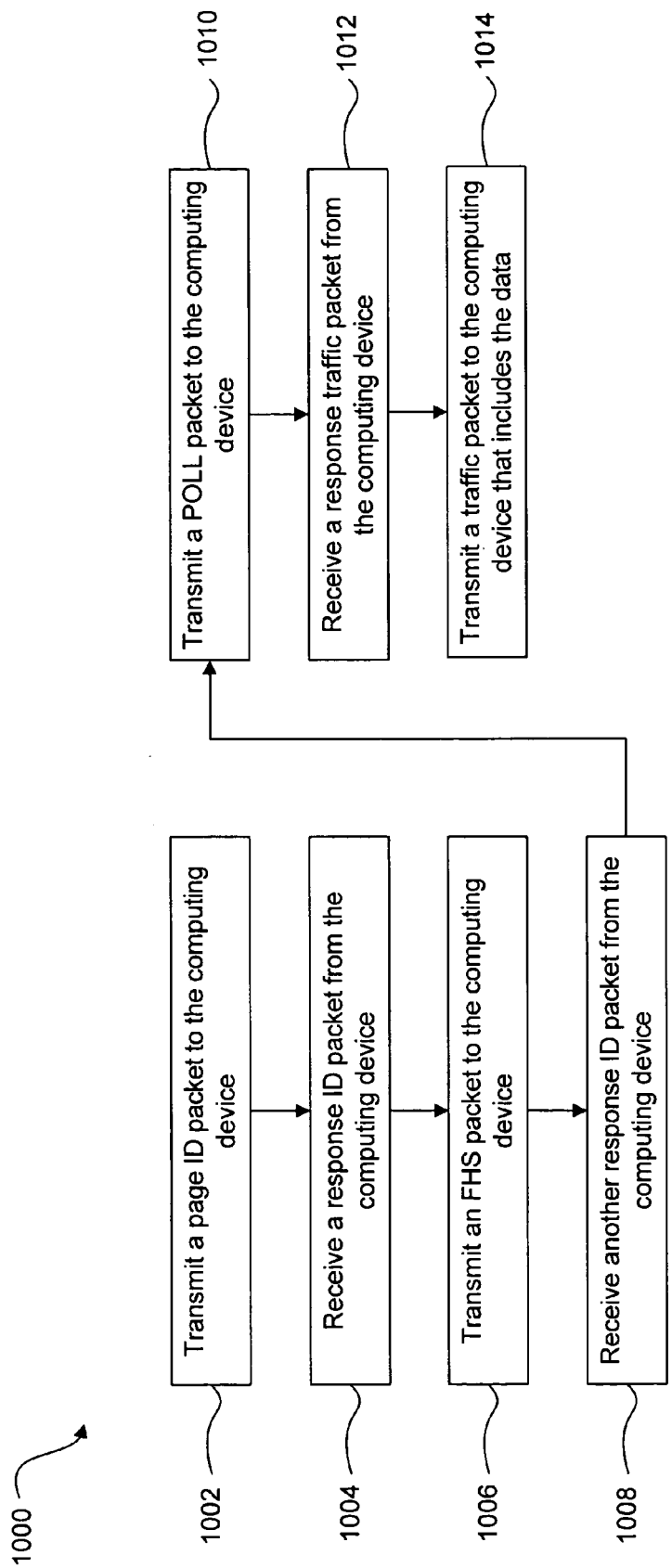
FIG. 10 illustrates an exemplary method that may be performed by the ID tag reader in the system of FIG. 6 in order to form a logical connection with the computing device.

FIG. 10 illustrates an exemplary method 1000 that may be performed by the ID tag reader 604 in the system 600 of FIG. 6 in order to form a logical connection with the computing device 608. In the embodiment shown in FIG. 10, the ID tag reader 604 is the master, and the computing device 608 is a slave.

The method 1000 begins when the ID tag reader 604 is in the page substate and the computing device 608 is in the page scan substate. The ID tag reader 604 transmits 1002 a page ID packet 738 to the computing device 608. The page ID packet 738 starts with the DAC 740, which is derived from the LAP 632b of the computing device transceiver address 614b. The ID tag reader 104 then receives 1004 a response ID packet 738 from the computing device 608, which has entered the slave response substate. The response ID packet 738 also starts with the DAC 740.

The ID tag reader 604 then enters the master response substate, and transmits 1006 an FHS packet 842 to the computing device 608. The FHS packet 842 starts with the DAC 840, and includes the LAP 632a of the ID tag reader transceiver address 614a and the clock settings 846 of the ID tag reader 604. The ID tag reader 604 then receives 1008 another response ID packet 738 from the computing device 608, which is still in the slave response substate. As before, this response ID packet 738 starts with the DAC 740.

Both the ID tag reader 604 and the computing device 608 then enter the connection state. The ID tag reader 604 then transmits 1010 a traffic packet 948, and more particularly, a POLL packet 948, to the computing device 608. The POLL packet 948 starts with the CAC 940, which is derived from the LAP 632a of the ID tag reader transceiver address 614a. The ID tag reader 604 then receives 1012 a response traffic packet 948 from the computing device 608. This response traffic packet 948 also starts with the CAC 940.

As discussed above, once a logical connection is established between the ID tag reader 604 and the computing device 608, the ID tag reader 604 typically transmits 1014 data to the computing device 608 via the logical connection. Data is typically transmitted 1014 to the computing device 608 in one or more traffic packets 948. Each traffic packet 948 uses the CAC as its access code 940.

Figure 11:
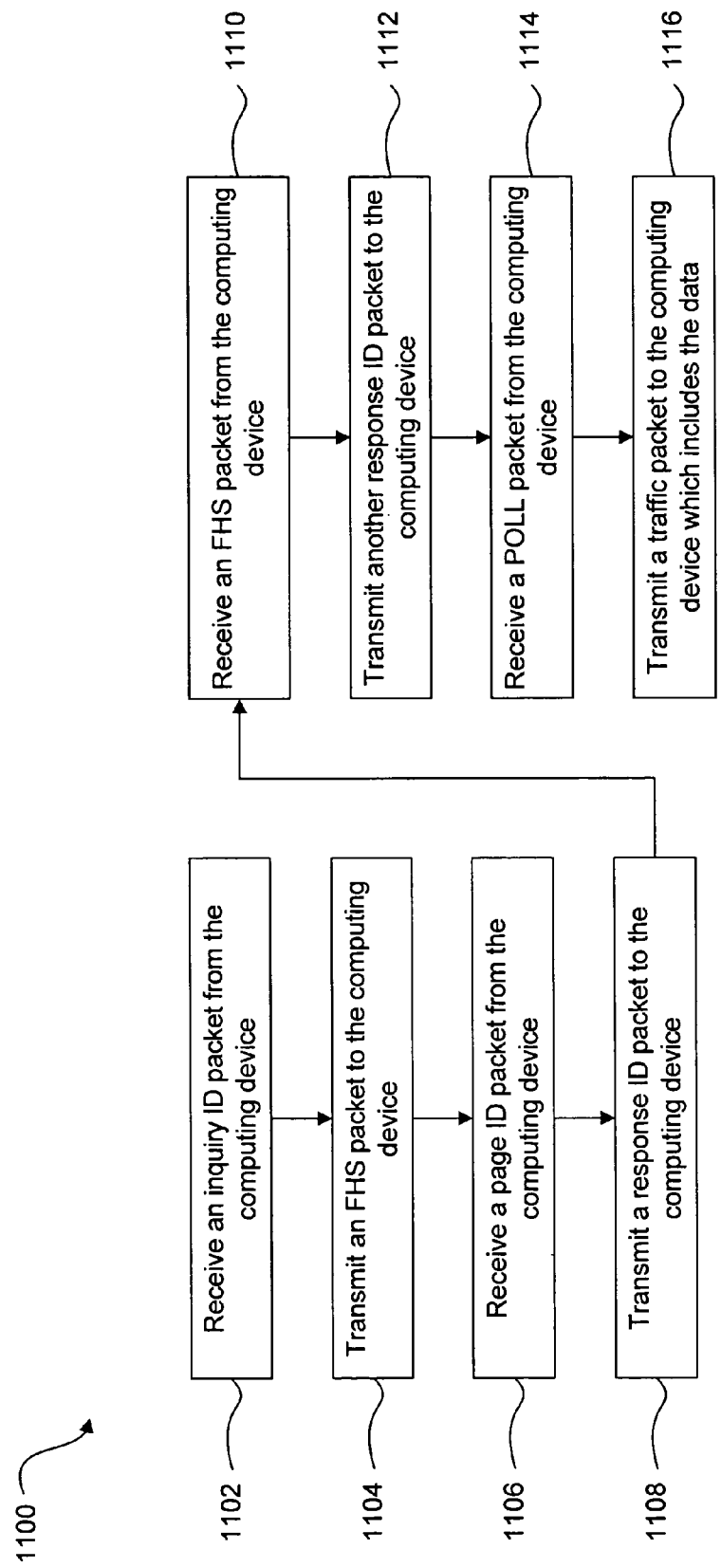
FIG. 11 illustrates another exemplary method that may be performed by the ID tag reader in the system of FIG. 6 in order to form a logical connection with the computing device.

FIG. 11 illustrates another exemplary method 1100 that may be performed by the ID tag reader 604 in the system 600 of FIG. 6 in order to form a logical connection with the computing device 608. In the embodiment shown in FIG. 11, the computing device 608 is the master, and the ID tag reader 604 is a slave.

The method 1100 begins when the computing device 608 is in the inquiry substate and the ID tag reader 604 is in the inquiry response substate. The ID tag reader 604 receives 1102 an inquiry ID packet 738 from the computing device 608. The inquiry ID packet 738 uses an IAC as its access code 740. The ID tag reader 604 responds by transmitting 1104 an FHS packet 842 to the computing device 608. The FHS packet 842 uses an IAC as its access code 840 and includes the LAP 632a of the ID tag reader transceiver address 614a and the clock settings 846 of the ID tag reader 604.

The computing device 608 then enters the page substate and the ID tag reader 604 enters the page scan substate. The ID tag reader 604 receives 1106 a page ID packet 738 from the computing device 608. The page ID packet 738 uses the DAC as its access code 740. The DAC is derived from the LAP 632a of the ID tag reader transceiver address 614a. The ID tag reader 604 then enters the slave response substate and transmits 1108 a response ID packet 738 to the computing device 608. The response ID packet 738 also uses the DAC as its access code 740.

The computing device 608 then enters the master response substate, and the ID tag reader 604 receives 1110 an FHS packet 842 from the computing device 608. The access code 840 used in the FHS packet 842 is the DAC. The FHS packet 842 also includes the LAP 632b of the computing device transceiver address 614b and the clock settings 846 of the computing device 608. The ID tag reader 604 then transmits 1112 another response ID packet 738 to the computing device 608. This response ID packet 738 also uses the DAC as the access code 740.

Both the ID tag reader 604 and the computing device 608 then enter the connection state. The ID tag reader 604 then receives 1114 a traffic packet 948, and more particularly, a POLL packet 948, from the computing device 608. The POLL packet 948 uses the CAC as its access code 940. The CAC is derived from the LAP 632b of the computing device transceiver address 614b.

As discussed above, once a logical connection is established between the ID tag reader 604 and the computing device 608, the ID tag reader 604 typically transmits 1116 data to the computing device 608 via the logical connection. Data is typically transmitted 1116 to the computing device 608 in one or more traffic packets 948. Each traffic packet 948 uses the CAC as its access code 940. The CAC is derived from the LAP 632b of the computing device transceiver address 614b (e.g., the BD_ADDR of the computing device 608). The address information 614 from the ID tag 602 specifies the computing device transceiver address 614b.

Figure 12:
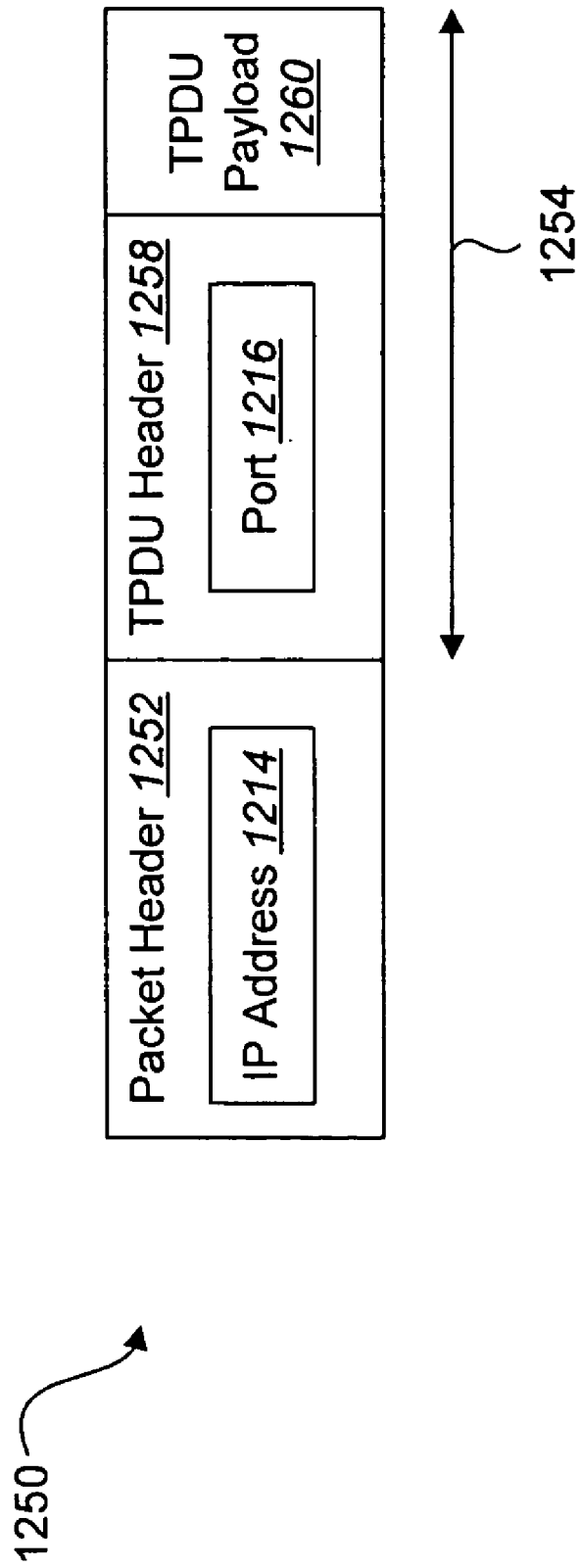
FIG. 12 illustrates an embodiment of an IP packet.

In some embodiments, the ID tag reader 104 forms a logical connection with the computing device 108 and sends data to the computing device 108 in accordance with the TCP/IP protocol or the UDP/IP protocol. The TCP/IP or UDP/IP connection may exist over a wired or a wireless network (e.g., an 802.11 network). In such embodiments, the ID tag reader 104 prepares an IP packet 1250 to be transmitted to the computing device 108. An embodiment of such an IP packet 1250 is shown in FIG. 12.

As shown, the IP packet 1250 includes an IP packet header 1252 and an IP packet payload 1254. The IP packet header 1252 includes the network address 1214, or IP address 1214, of the computing device 108. The IP packet payload 1254 includes a transport protocol data unit (TPDU)

1254, which refers to either a TCP segment or a UDP segment. The TPDU 1254 includes a TPDU header 1258 and a TPDU payload 1260. The TPDU header 1258 includes the port 1216 associated with the program 110 that is executing on the computing device 108. The TPDU payload 1260 generally includes data to be transmitted to the computing device 108. Those skilled in the art will recognize that when the IP packet 1250 is transmitted to the computing device 108, it is generally contained within at least one other data unit, such as a frame, that corresponds to a lower layer protocol. The address information 114 from the ID tag 102 specifies the IP address 1214 of the computing device 108 and the port number 1216 associated with a program 110 that is running on the computing device 108.

Figure 13:
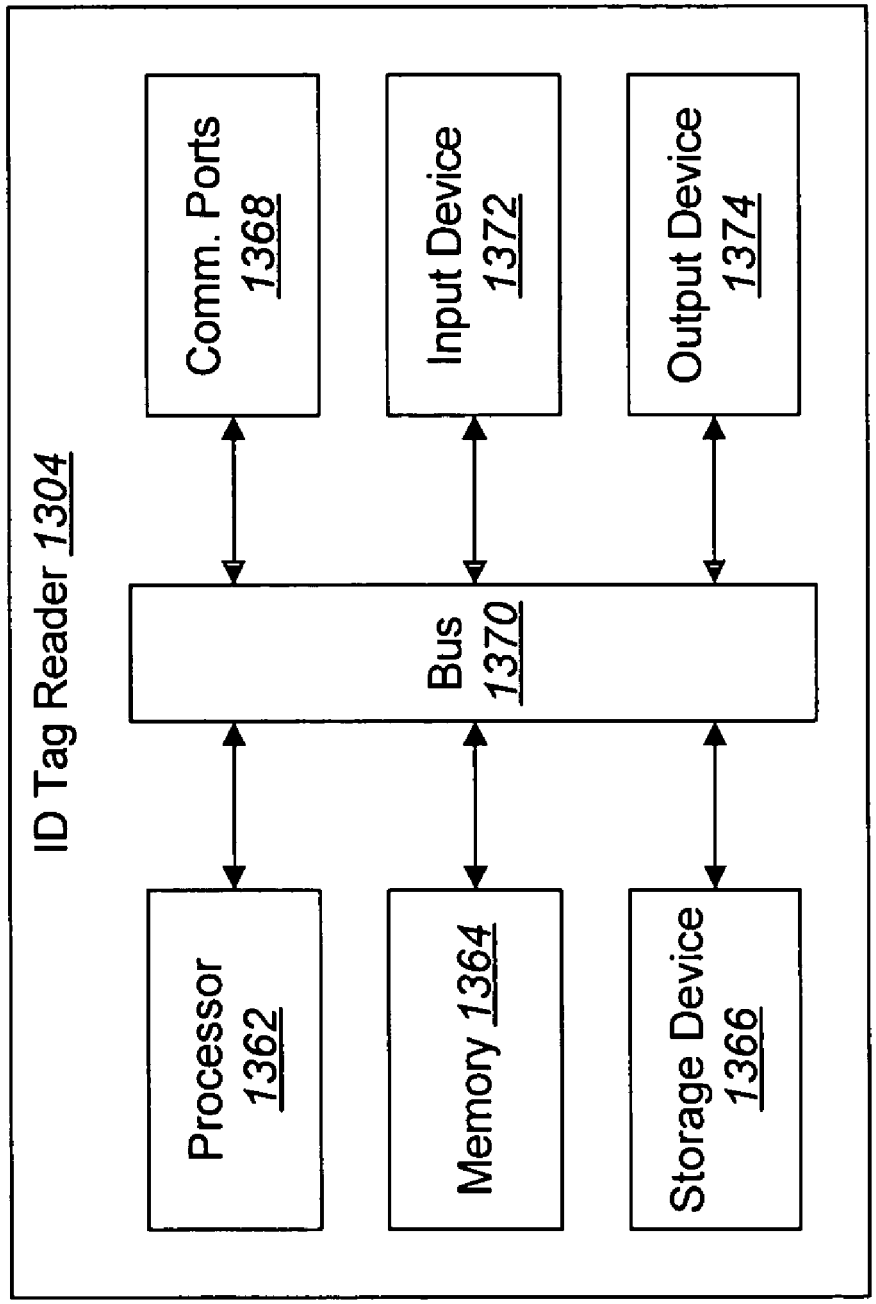
FIG. 13 illustrates hardware components that may be used in an embodiment of an ID tag reader.

FIG. 13 illustrates hardware components that may be used in an embodiment of an ID tag reader 1304. The diagram of FIG. 13 illustrates typical components of an ID tag reader 1304 including a processor 1362, memory 1364, a storage device 1366, and one or more communication ports 1368. A bus 1370 electronically couples all of the components in the ID tag reader 1304. Each of these components is known to those skilled in the art.

It will be appreciated by those skilled in the art that more components may be included in the ID tag reader 1304. For example, one or more input devices 1372 may be included, such as a input button. In addition, one or more output devices 1374 may be included, such as a display screen. Thus, those skilled in the art will appreciate that additional components may be added to the ID tag reader 1304 without detracting from the functionality to serve as an ID tag reader 1304. Those skilled in the art will also appreciate that the components shown in FIG. 13 are typically included in embodiments of the computing device 108 to which the ID tag reader 1304 sends data.

Figure 14:
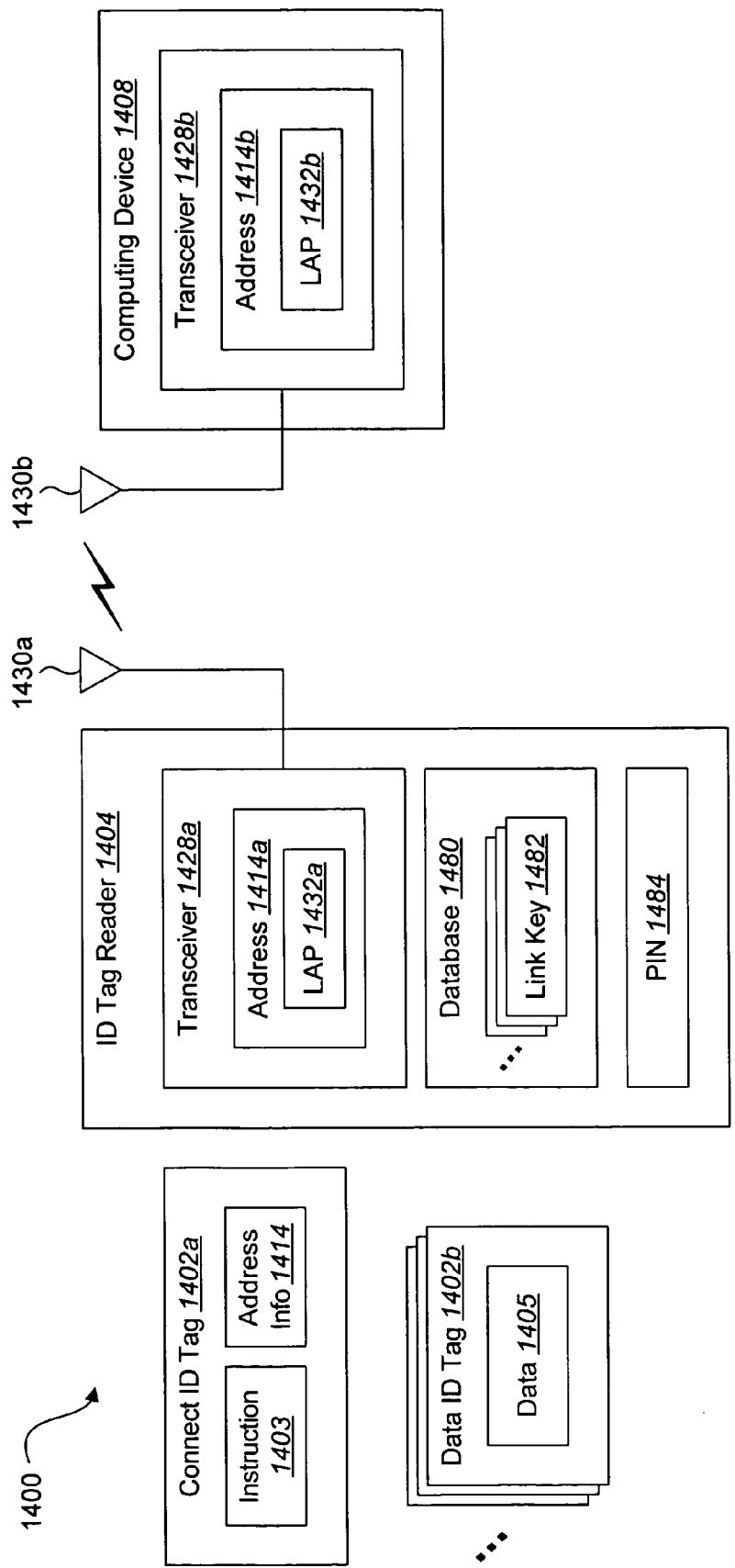
FIG. 14 illustrates another exemplary system in which some embodiments may be practiced.

FIG. 14 illustrates another exemplary system 1400 in which some embodiments may be practiced. The system 1400 includes one or more ID tags 1402, including a connect ID tag 1402a and one or more data ID tags 1402b. The connect ID tag 1402a includes an instruction 1403 to form a logical connection between the ID tag reader 1404 and the computing device 1408 and to send subsequently obtained data 1405 to the computing device 1408 via this connection. The connect ID tag 1402a also includes address information 1414 associated with the computing device 1408. The data ID tags 1402b include data 1405 to be sent to the computing device 1408. The system 1400 also includes an ID tag reader 1404 and a computing device 1408. Communication between the ID tag reader 1404 and the computing device 1408 occurs over a wireless communication link according to a Bluetooth standard. The ID tag reader 1404 includes an ID tag reader transceiver 1428a and an ID tag reader antenna 1430a. The computing device 1408 includes a computing device transceiver 1428b and a computing device antenna 1430b. The ID tag reader transceiver 1428a is associated with an ID tag reader transceiver address 1414a that includes a lower address part (LAP) 1432a. The computing device transceiver 1428b is associated with a computing device transceiver address 1414b that includes a lower address part (LAP) 1432b. These components operate similarly to the corresponding components discussed previously and will not be discussed again in connection with FIG. 14.

In the embodiment shown in FIG. 14, the ID tag reader 1404 is the master and the computing device 1408 is the slave with respect to communication that occurs between the ID tag reader 1404 and the computing device 1408. The ID tag reader 1404 includes a link key database 1480. The link key database 1480 includes a plurality of link keys 1482. Link keys 1482 are used in Bluetooth communications for authentication purposes. Each link key 1482 in the link key database 1480 may be used to authenticate the ID tag reader 1404 to a particular computing device 1408. The link key database 1480 is typically stored in non-volatile memory within the ID tag reader 1404. In alternative embodiments, the link key database 1480 may be stored on a separate computing device with which the ID tag reader 1404 is in electronic communication.

When authentication is enabled on an ID tag reader 1404, the first time that the ID tag reader 1404 establishes a logical connection with a computing device 1408, the computing device 1408 enters a PIN 1484 associated with the ID tag reader 1404 for authentication purposes. Typically, a user of the computing device 1408 enters the PIN 1484. In some embodiments, the PIN 1484 is the serial number 1484 of the ID tag reader 1404. A link key 1482 is then generated for the connection between the ID tag reader 1404 and the computing device 1408. In some embodiments, the ID tag reader 1404 generates the link key 1482. Alternatively, or in addition, the computing device 1408 may generate the link key 1482. The PIN 1484, the ID tag reader transceiver address 1414a, the computing device transceiver address 1414b, and other information may be used to generate the link key 1482. The ID tag reader 1404 stores the link key 1482 in the link key database 1480. Thereafter, each time that a connection is attempted between the ID tag reader 1404 and the computing device 1408, the stored link key 1482 is retrieved and the connection is established using the link key 1482. Thus, the entry of a PIN 1484 is only required the first time that the ID tag reader 1404 connects to the computing device 1408.

Figure 15:
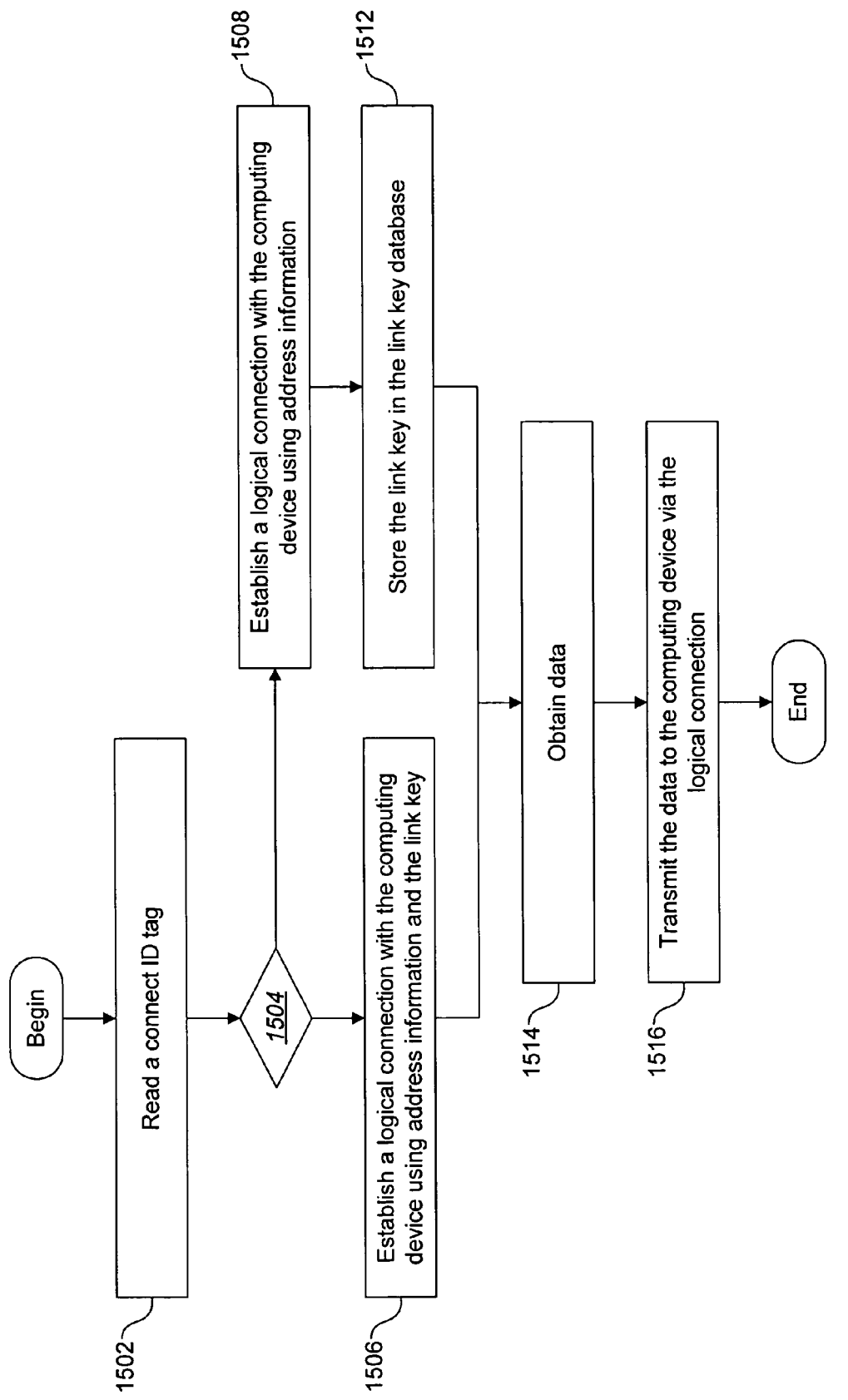
FIG. 15 illustrates an embodiment of a method that may be performed by an ID tag reader in the system shown in FIG. 14.

FIG. 15 illustrates an embodiment of a method 1500 that may be performed by an ID tag reader 1404 in the system 1400 shown in FIG. 14. In the illustrated embodiment, authentication is enabled on the ID tag reader 1404. The ID tag reader 1404 is the master, and the computing device 1408 is the slave.

The method 1500 begins when the ID tag reader 1404 reads 1502 a connect ID tag 1402a. As discussed previously, the connect ID tag 1402a includes an instruction 1403 to form a logical connection between the ID tag reader 1404 and the computing device 1408 and to send subsequent data 1405 to the computing device 1408 via this connection. The connect ID tag 1402a also includes address information 1414 associated with the computing device 1408.

The ID tag reader 1404 then determines 1504 whether the link key database 1480 includes a link key 1482 associated with the computing device 1408. If it is determined 1504 that the link key database 1480 includes a link key 1482 associated with the computing device 1408, the ID tag reader 1404 establishes 1506 a logical connection with the computing device 1408 using the address information 1414 and the link key 1482. Thus, no PIN 1484 entry is required on the computing device 1408.

If it is determined 1504 that the link key database 1480 does not include a link key 1482 associated with the computing device 1408, the ID tag reader 1404 establishes 1508 a logical connection with the computing device 1408 without a link key 1482. Because a link key 1482 does not exist for the connection, a user of the computing device 1408 is prompted to enter a PIN 1484 for authentication. In some embodiments, the PIN 1484 is the serial number 1484 of the ID tag reader 1404. As before, the address information 1414 associated with the computing device 1408 is used to establish the logical connection with the computing device 1408.

As part of the connection and authentication process, a link key 1482 associated with the computing device 1408 is generated. In some embodiments, the ID tag reader 1404 generates the link key 1482. Alternatively, or in addition, the computing device 1408 may generate the link key 1482. Once the link key 1482 is generated, the ID tag reader 1404 stores 1512 the link key 1482 in the link key database 1480.

The ID tag reader 1404 obtains 1514 data 1405. In some embodiments, the step of obtaining 1514 data 1405 may be performed by reading a data ID tag 1402*b*. Alternatively, or in addition, the connect ID tag 1402*a* may include data 1405 and the data 1405 may be obtained from the connect ID tag 1402*a*. The ID tag reader 1404 transmits 1516 the data 1405 to the computing device 1408 via the logical connection that was previously established.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In an identification tag reader, a method comprising:
   reading a first identification tag that comprises an instruction to form a logical connection with a computing device;
   using address information associated with the computing device to form the logical connection with the computing device in accordance with the instruction;
   obtaining data;
   transmitting the data to the computing device via the logical connection; and
   on subsequent power up, attempting to form a new logical connection with a same computing device to which the identification tag reader was most recently connected.

2. The method of claim 1, wherein the first identification tag comprises the address information.

3. The method of claim 1, wherein the first identification tag comprises a reference to the address information.

4. The method of claim 1, wherein obtaining the data comprises reading a second identification tag that comprises the data.

5. The method of claim 1, wherein obtaining the data comprises reading a second identification tag that comprises a reference to the data.

6. The method of claim 1, wherein the first identification tag comprises the data.

7. The method of claim 1, wherein the first identification tag comprises a reference to the data.

8. The method of claim 1, wherein a program is executing on the computing device, wherein the data is transmitted to the program, and wherein the address information comprises a port associated with the program.

9. The method of claim 1, wherein the identification tag reader and the computing device are part of a computer network, and wherein the address information comprises a network address associated with the computing device.

10. The method of claim 1, wherein the first identification tag is selected from the group consisting of a graphical code, a radio frequency identification tag, and a magnetic stripe, and wherein the identification tag reader is selected from the group consisting of a graphical code reader, a radio frequency identification tag reader, and a magnetic stripe reader.

11. The method of claim 1, wherein the logical connection with the computing device is formed in accordance with a Bluetooth standard.

12. The method of claim 11, wherein the address information comprises a computing device transceiver address, and wherein using the address information to form the logical connection with the computing device comprises transmitting a page identification packet to the computing device, the page identification packet comprising a device access code that is derived from a lower address part of the computing device transceiver address.

13. The method of claim 11, wherein the address information comprises a computing device transceiver address, and wherein using the address information to form the logical connection with the computing device comprises transmitting a traffic packet to the computing device, the traffic packet comprising a channel access code that is derived from a lower address part of the computing device transceiver address.

14. The method of claim 1, wherein the logical connection with the computing device is formed in accordance with a protocol selected from the group consisting of TCP/IP and UDP/JP.

15. The method of claim 14, wherein the address information comprises an IP address associated with the computing device and a port associated with a program that is executing on the computing device, and wherein using the address information to form the logical connection with the computing device comprises preparing an IP packet that comprises the IP address and the port.

16. The method of claim 15, wherein the logical connection with the computing device exists over a wireless network.

17. An identification tag reader, comprising:
   a processor;
   memory in electronic communication with the processor;
   instructions stored in the memory, the instructions being executable by the processor to implement a method comprising:
      reading a first identification tag that comprises an instruction to form a logical connection with a computing device;
      using address information associated with the computing device to form the logical connection with the computing device in accordance with the instruction;
      obtaining data;
      transmitting the data to the computing device via the logical connection; and
      on subsequent power up, attempting to form a new logical connection with a same computing device to which the identification tag reader was most recently connected.

18. The identification tag reader of claim 17, wherein the first identification tag comprises the address information.

19. The identification tag reader of claim 17, wherein the first identification tag comprises a reference to the address information.

20. The identification tag reader of claim 17, wherein obtaining the data comprises reading a second identification tag that comprises the data.

21. The identification tag reader of claim 17, wherein obtaining the data comprises reading a second identification tag that comprises a reference to the data.

22. The identification tag reader of claim 17, wherein the first identification tag comprises the data.

23. The identification tag reader of claim 17, wherein the first identification tag comprises a reference to the data.

24. The identification tag reader of claim 17, wherein a program is executing on the computing device, wherein the data is transmitted to the program, and wherein the address information comprises a port associated with the program.

25. The identification tag reader of claim 17, wherein the identification tag reader and the computing device are part of a computer network, and wherein the address information comprises a network address associated with the computing device.

26. The identification tag reader of claim 17, wherein the first identification tag is selected from the group consisting of a graphical code, a radio frequency identification tag, and a magnetic stripe, and wherein the identification tag reader is selected from the group consisting of a graphical code reader, a radio frequency identification tag reader, and a magnetic stripe reader.

27. The identification tag reader of claim 17, wherein the logical connection with the computing device is formed in accordance with a Bluetooth standard.

28. The identification tag reader of claim 27, wherein the address information comprises a computing device transceiver address, and wherein using the address information to form the logical connection with the computing device comprises transmitting a page identification packet to the computing device, the page identification packet comprising a device access code that is derived from a lower address part of the computing device transceiver address.

29. The identification tag reader of claim 27, wherein the address information comprises a computing device transceiver address, and wherein using the address information to form the logical connection with the computing device comprises transmitting a traffic packet to the computing device, the traffic packet comprising a channel access code that is derived from a lower address part of the computing device transceiver address.

30. The identification tag reader of claim 17, wherein the logical connection with the computing device is formed in accordance with a protocol selected from the group consisting of TCP/IP and UDP/IP.

31. The identification tag reader of claim 30, wherein the address information comprises an IP address associated with the computing device and a port associated with a program that is executing on the computing device, and wherein using the address information to form the logical connection with the computing device comprises preparing an IP packet that comprises the IP address and the port.

32. The identification tag reader of claim 31, wherein the logical connection with the computing device exists over a wireless network.

33. An identification tag reader, comprising:
a processor;
memory in electronic communication with the processor; and
instructions stored in the memory, the instructions being executable by the processor to implement a method comprising:
reading an identification tag that comprises an instruction to form a logical connection with a computing device;
determining whether a link key database includes a link key associated with the computing device;
if the link key database includes the link key, establishing a logical connection with the computing device using address information associated with the computing device and the link key;
if the link key database does not include the link key:
establishing a logical connection with the computing device using address information associated with the computing device, wherein the computing device enters a PIN for authentication, and wherein the link key is generated; and
storing the link key in the link key database;
obtaining data; and
transmitting the data to the computing device via the logical connection.

34. The identification tag reader of claim 33, wherein the link key is generated according to a Bluetooth standard.

35. The identification tag reader of claim 33, wherein the identification tag reader is the master, and wherein the computing device is the slave.

36. The identification tag reader of claim 33, wherein the PIN comprises a serial number of the identification tag reader.

37. The identification tag reader of claim 33, wherein the method further comprises generating the link key.

38. The identification tag reader of claim 33, wherein the computing device generates the link key.

39. In an identification tag reader, a method comprising:
reading an identification tag that comprises an instruction to form a logical connection with a computing device;
determining whether a link key database includes a link key associated with the computing device;
if the link key database includes the link key, establishing a logical connection with the computing device using address information associated with the computing device and the link key;
if the link key database does not include the link key:
establishing a logical connection with the computing device using address information associated with the computing device, wherein the computing device enters a PIN for authentication, and wherein the link key is generated; and
storing the link key in the link key database;
obtaining data; and
transmitting the data to the computing device via the logical connection.

40. The method of claim 39, wherein the link key is generated according to a Bluetooth standard.

41. The method of claim 39, wherein the identification tag reader is the master, and wherein the computing device is the slave.

42. The method of claim 39, wherein the PIN comprises a serial number of the identification tag reader.

43. The method of claim 39, further comprising generating the link key.

44. The method of claim 39, wherein the computing device generates the link key.

* * * * *